United States Patent
Wang et al.

(10) Patent No.: US 12,455,653 B2
(45) Date of Patent: Oct. 28, 2025

(54) TOUCH INTERACTION METHOD AND DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Zhiqiang Wang, Beijing (CN); Ping Luo, Beijing (CN); Guiyu Zhang, Beijing (CN); Shuai Liu, Beijing (CN); Liqing Jiang, Beijing (CN); Shukui Yang, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 18/554,633

(22) PCT Filed: Feb. 21, 2023

(86) PCT No.: PCT/CN2023/077277
§ 371 (c)(1),
(2) Date: Oct. 10, 2023

(87) PCT Pub. No.: WO2023/197748
PCT Pub. Date: Oct. 19, 2023

(65) Prior Publication Data
US 2025/0085805 A1 Mar. 13, 2025

(30) Foreign Application Priority Data
Apr. 15, 2022 (CN) .......................... 202210396116.6

(51) Int. Cl.
G06F 3/041 (2006.01)
G06F 1/16 (2006.01)
G06F 3/02 (2006.01)

(52) U.S. Cl.
CPC ........ G06F 3/04166 (2019.05); G06F 1/1616 (2013.01); G06F 3/0202 (2013.01)

(58) Field of Classification Search
CPC ... G06F 3/04166; G06F 1/1616; G06F 3/0202
See application file for complete search history.

(56) References Cited

U.S. PATENT DOCUMENTS 10,156,871 B2* 12/2018 Wang .................. G06F 1/1679
10,198,044 B2* 2/2019 Lyles ................... G06F 1/1616
(Continued)

FOREIGN PATENT DOCUMENTS

CN 109710110 A 5/2019
CN 110456857 A 11/2019
(Continued)

OTHER PUBLICATIONS

Office Action for the Chinese Patent Application No. 202220885692.2 issued by the Chinese Patent Office on Jun. 21, 2022.
(Continued)

Primary Examiner — Doon Y Chow
(74) Attorney, Agent, or Firm — XSENSUS LLP

(57) ABSTRACT

A touch interaction device includes an electronic device including a screen, an accessory device subordinate to the electronic device, and at least one sensing device. The at least one sensing device is disposed at a bottom of the accessory device, or the at least one sensing device is disposed at the bottom of the accessory device and on the electronic device. The electronic device is configured to: determine whether the accessory device is placed on the screen of the electronic device according to sensing infor-
(Continued)

mation of the at least one sensing device; determine a screen shielding area according to position information of the at least one sensing device in a case where the accessory device is placed on the screen of the electronic device; and adjust touch scanning frequency of the screen shielding area and turn off display drive of the screen shielding area according to the screen shielding area.

16 Claims, 8 Drawing Sheets

(56) References Cited

U.S. PATENT DOCUMENTS

| | | | | |
|---|---|---|---|---|
| 10,747,264 B1* | 8/2020 | Knoppert | | G06F 1/1677 |
| 10,747,272 B1* | 8/2020 | Morrison | | G06F 1/1677 |
| 10,811,201 B1* | 10/2020 | Files | | G06F 3/1446 |
| 10,989,978 B1* | 4/2021 | Tsen | | G06F 3/04886 |
| 10,990,204 B1* | 4/2021 | Trim | | G06F 1/1669 |
| 11,586,296 B2* | 2/2023 | Morrison | | G06F 3/0393 |
| 2011/0047459 A1* | 2/2011 | Van Der Westhuizen | | G06F 3/04883 |
| | | | | 345/173 |
| 2014/0211394 A1* | 7/2014 | Lin | | G06F 1/1647 |
| | | | | 361/679.17 |
| 2019/0341006 A1 | 11/2019 | Mori et al. | | |

FOREIGN PATENT DOCUMENTS

| | | |
|---|---|---|
| CN | 111158496 A | 5/2020 |
| CN | 113383291 A | 9/2021 |
| CN | 113823207 A | 12/2021 |
| CN | 113867478 A | 12/2021 |
| JP | 2022023849 A | 2/2022 |
| WO | 2021008616 A1 | 1/2021 |

OTHER PUBLICATIONS

Office Action for the Chinese Patent Application No. 202220885692.2 issued by the Chinese Patent Office on Sep. 26, 2022.
Office Action for the Chinese Patent Application No. 202220885692.2 issued by the Chinese Patent Office on Dec. 12, 2022.

* cited by examiner

TOUCH INTERACTION METHOD AND DEVICE

CROSS-REFERENCE TO RELATED APPLICATIONS

This application is a national phase entry under 35 USC 371 of International Patent Application No. PCT/CN2023/077277, filed on Feb. 21, 2023, which claims priority to Chinese Patent Application No. 202210396116.6, filed on Apr. 15, 2022, which are incorporated herein by reference in their entirety.

TECHNICAL FIELD

The present disclosure relates to the field of touch technologies, and in particular, to a touch interaction method and device.

BACKGROUND

With the development of display technology, a flexible screen has attracted much attention due to its lightness and thinness, flexibility, bendability and other characteristics. Due to the dual-screen and bendable characteristics, the flexible foldable screen electronic devices can provide users with new interaction methods to meet more needs of users for the electronic devices and adapt to more application scenarios. For example, the electronic device is a foldable screen notebook computer, any screen of the foldable screen notebook computer may be a virtual keyboard area, and the user may interact with the foldable screen notebook computer by touching the virtual keyboard on the screen.

SUMMARY

In an aspect, a touch interaction device is provided. The touch interaction device includes an electronic device including a screen, an accessory device subordinate to the electronic device, and at least one sensing device. The at least one sensing device is disposed at a bottom of the accessory device, or the at least one sensing device is disposed at the bottom of the accessory device and on the electronic device. The electronic device is configured to: determine whether the accessory device is placed on the screen of the electronic device according to sensing information of the at least one sensing device; determine a screen shielding area according to position information of the at least one sensing device in a case where the accessory device is placed on the screen of the electronic device, the screen shielding area being an area of the screen of the electronic device blocked by the accessory device; and adjust touch scanning frequency of the screen shielding area and turn off display drive of the screen shielding area according to the screen shielding area.

In some embodiments, the at least one sensing device includes at least one Hall sensor and a magnetic device corresponding to the Hall sensor.

In some embodiments, the Hall sensor is disposed on the electronic device, and the magnetic device is disposed at the bottom of the accessory device. Alternatively, the Hall sensor is disposed at the bottom of the accessory device, and the magnetic device is disposed on the electronic device.

In some embodiments, the electronic device being configured to adjust the touch scanning frequency of the screen shielding area according to the screen shielding area, including: turning off touch scanning of the screen shielding area according to the screen shielding area.

In some embodiments, the screen of the electronic device includes one or more preset areas, each preset area corresponds to a control instruction, and the control instruction is used for turning off touch scanning and display drive of the preset area. Each preset area includes at least one of the at least one sensing device, the screen shielding area includes at least one preset area, and the electronic device includes a processor, a touch chip and a display drive chip.

The processor is configured to send at least one control instruction in one-to-one correspondence to the at least one preset area to the touch chip and the display drive chip according to the at least one preset area.

The touch chip is configured to, according to the at least one control instruction, turn off touch scanning of the at least one preset area corresponding to the at least one control instruction.

The display drive chip is configured to, according to the at least one control instruction, turn off display drive of the at least one preset area corresponding to the at least one control instruction.

In some embodiments, the at least one sensing device is disposed at the bottom of the accessory device, and the at least one sensing device includes at least one of at least one device with a conductive function and at least one signal transmitter.

In some embodiments, the electronic device being configured to adjust the touch scanning frequency of the screen shielding area according to the screen shielding area, includes: the electronic device being configured to reduce the touch scanning frequency of the screen shielding area according to the screen shielding area.

In some embodiments, the electronic device is further configured to: restore the touch scanning frequency of the screen shielding area and turn on the display drive of the screen shielding area in a case where it is determined that the accessory device is away from the screen of the electronic device.

In some embodiments, the screen of the electronic device is a foldable screen.

In some embodiments, the accessory device includes a keyboard.

In some embodiments, the screen of the electronic device is a foldable screen. A dimension of a long side of the keyboard is smaller than or equal to a dimension of a short side of the electronic device, and a dimension of a short side of the keyboard is smaller than or equal to a dimension of a half of a long side the electronic device. The short side of the electronic device is parallel to a folding line of the foldable screen of the electronic device, and the long side of the electronic device is perpendicular to the folding line of the foldable screen of the electronic device.

In another aspect, a touch interaction method is provided. The touch interaction method is applied to a touch interaction device. The touch interaction device includes an electronic device including a screen, an accessory device subordinate to the electronic device, and at least one sensing device. The at least one sensing device is disposed at a bottom of the accessory device, or the at least one sensing device is disposed at the bottom of the accessory device and on the electronic device. The method includes: the electronic device determining whether the accessory device is placed on the screen of the electronic device according to sensing information of the at least one sensing device; the electronic device determining a screen shielding area according to position information of the at least one sensing device in a case where the accessory device is placed on the screen of the electronic device, the screen shielding area being an area of the screen of the electronic device blocked by the accessory device; and the electronic device adjusting touch scanning frequency of the screen shielding area and turning off display drive of the screen shielding area according to the screen shielding area.

In some embodiments, the at least one sensing device includes at least one Hall sensor and a magnetic device corresponding to the Hall sensor.

In some embodiments, adjusting the touch scanning frequency of the screen shielding area according to the screen shielding area, includes: turning off touch scanning of the screen shielding area according to the screen shielding area.

In some embodiments, the screen of the electronic device includes a plurality of preset areas, each preset area corresponds to a control instruction, and the control instruction is used for turning off touch scanning and display drive of the preset area. Each preset area includes at least one of the at least one sensing device, the screen shielding area includes at least one preset area, and the electronic device includes a processor, a touch chip and a display drive chip. The electronic device adjusting the touch scanning frequency of the screen shielding area and turning off the display drive of the screen shielding area according to the screen shielding area, includes: the processor sending at least one control instruction in one-to-one correspondence to the at least one preset area to the touch chip and the display drive chip according to the at least one preset area; the touch chip turning off touch scanning of the at least one preset area corresponding to the at least one control instruction according to the at least one control instruction; and the display drive chip turning off display drive of the at least one preset area corresponding to the at least one control instruction according to the at least one control instruction.

In some embodiments, the at least one sensing device is disposed at the bottom of the accessory device, and the at least one sensing device includes at least one of at least one device with a conductive function and at least one signal transmitter.

In some embodiments, adjusting the touch scanning frequency of the screen shielding area according to the screen shielding area, includes: reducing the touch scanning frequency of the screen shielding area according to the screen shielding area.

In some embodiments, the touch interaction method further includes: restoring the touch scanning frequency of the screen shielding area and turning on the display drive of the screen shielding area in a case where it is determined that the accessory device is away from the screen of the electronic device.

In yet another aspect, a non-transitory computer-readable storage medium is provided. The computer-readable storage medium has stored thereon computer program instructions that, when executed by a computer, perform the touch interaction method as described in any of the above embodiments.

In yet another aspect, a computer program product stored on a non-transitory computer-readable storage medium is provided. The computer program product includes computer program instructions that are used for causing a computer to perform the touch interaction method as described in any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on an actual size of a product, an actual process of a method and an actual timing of a signal to which the embodiments of the present disclosure relate.

DETAILED DESCRIPTION

Figure 1:
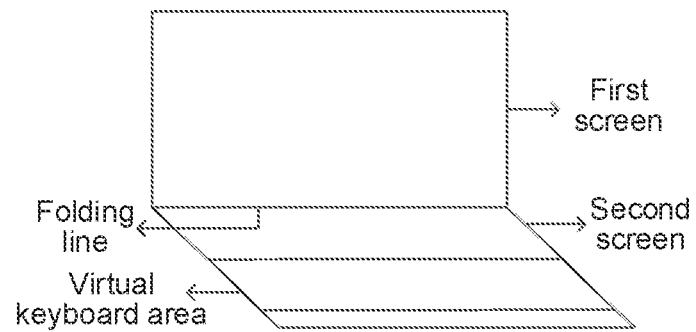
FIG. 1 is a structural diagram of a foldable dual-screen notebook computer, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined with "first" or "second" may explicitly or implicitly include one or more of the features. In the description of the embodiments of the present disclosure, the term "a plurality of" or "the plurality of" means two or more unless otherwise specified.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The phrase "applicable to" or "configured to" as used herein indicates an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

The term "about", "substantially" or "approximately" as used herein includes a stated value and an average value within an acceptable range of deviation of a particular value. The acceptable range of deviation is determined by a person of ordinary skill in the art in consideration of the measurement in question and errors associated with the measurement of a particular quantity (i.e., limitations of the measurement system).

Generally, compared with a traditional electronic device, a mouse function of a foldable screen electronic device is weakened, and a touch function thereof is significantly enhanced. As shown in FIG. 1, by considering the foldable dual-screen notebook computer as an example, the foldable dual-screen notebook computer includes a first screen and a second screen, the first screen and the second screen are divided according to a long central axis (a folding line shown in FIG. 1) of the foldable dual-screen notebook computer, and any screen (e.g., the first screen or the second screen shown in FIG. 1) of the foldable dual-screen notebook computer may be a virtual keyboard area. The user may interact with the foldable dual-screen notebook computer by touching the virtual keyboard on the screen.

However, since the virtual keyboard of the foldable dual-screen notebook computer substantially has no key process and rebound, when the user touches the virtual keyboard on the screen, the user has an interactive tactile experience and feedback (e.g., typing) not as good as the physical keyboard, so that the user has a poor experience. In addition, if the user places the physical keyboard on the first screen or the second screen of the foldable dual-screen notebook computer, the screen covered by the physical keyboard is still performed touch scanning and display, which will cause unnecessary power consumption of the foldable dual-screen notebook computer.

Therefore, some embodiments of the present disclosure provide a touch interaction method. A sensing device is provided at a bottom of an accessory device of an electronic device, and it may be determined that the accessory device is placed on a screen of a foldable screen electronic device according to sensing information of the sensing device. Then a screen shielding area may be determined according to a position of the sensing device. By adjusting a touch scanning frequency of the screen shielding area and turning off display drive of the screen shielding area, touch scanning and display power consumption of the screen of the electronic device may be reduced, and endurance capacity of the electronic device may be enhanced.

Figure 2:
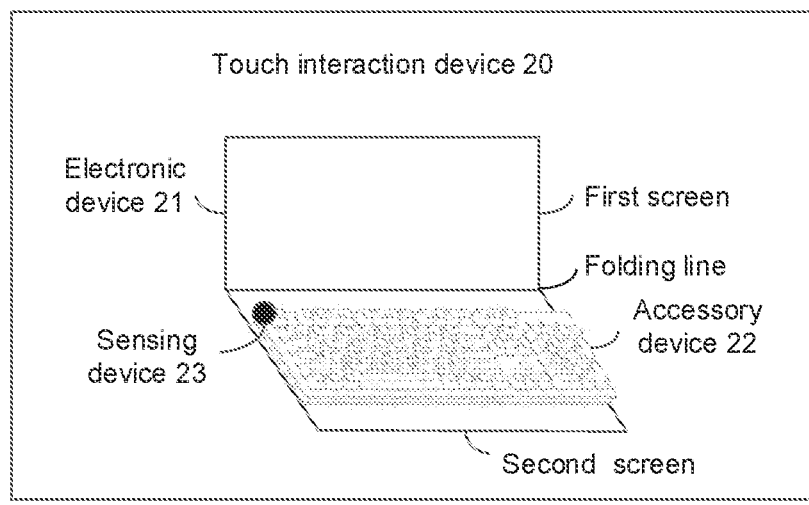
FIG. 2 is a structural diagram of a touch interaction device, in accordance with some embodiments.

The touch interaction method provided by some embodiments of the present disclosure may be applied to a touch interaction device 20. As shown in FIG. 2, the touch interaction device 20 includes an electronic device 21, an accessory device 22 subordinate to the electronic device 21, and at least one sensing device 23. The sensing device 23 is provided at a bottom of the accessory device 22; alternatively, the sensing device 23 is provided at the bottom of the accessory device 22 and on the electronic device 21.

In some embodiments, the electronic device 21 may be a device including a touch panel, such as a mobile phone, a tablet computer, a desktop computer, a laptop, a handheld computer, a notebook computer, an ultra-mobile personal computer (UMPC), a netbook, a cellular phone, a personal digital assistant (PDA), an augmented reality (AR) device, or a virtual reality (VR) device. The embodiments of the present disclosure do not specially limit the specific form of the electronic device 21.

In some embodiments, the electronic device 21 may be a foldable screen electronic device. The number of screens included in the electronic device 21 is not limited in the present disclosure. For example, the electronic device 21 may be a foldable dual-screen electronic device, a foldable triple-screen electronic device, or other electronic devices including one or more touch screens. The following embodiments will be illustrated exemplarily by considering an example in which the electronic device 21 is a foldable dual-screen notebook computer.

In some embodiments, in a case where the electronic device 21 is the foldable dual-screen notebook computer, the electronic device 21 includes a display screen (also referred to as a touch screen or a screen), a system motherboard, a processor, a memory, a rechargeable battery, a hinge, a bezel, a housing, and other components. The short sides of the electronic device 21 are parallel to the folding line of the electronic device 21, and the long sides of the electronic device 21 are perpendicular to the folding line of the electronic device 21.

In some embodiments, the electronic device 21 may further include a touch chip and a display drive chip. The touch chip is used to control touch scanning of the screen, and the display drive chip is used to control display drive of the screen. For example, the touch chip may turn on or turn off the touch scanning of a part of area of the screen of the electronic device 21. For another example, the touch chip may also adjust the touch scanning frequency of a part of area of the screen of the electronic device 21. For another example, the display drive chip may turn on or turn off the display drive of a part of area of the screen of the electronic device 21.

In some embodiments, the accessory device 22 may be a keyboard, such as a wired keyboard or a wireless keyboard (e.g., a bluetooth keyboard). The present disclosure does not limit the type of the accessory device 22. The following embodiments will be illustrated exemplarily by considering an example in which the accessory device 22 is the bluetooth keyboard.

In some embodiments, a dimension of a long side of the bluetooth keyboard is smaller than or equal to a dimension of a short side of the electronic device 21, and a dimension of a short side of the bluetooth keyboard is less than or equal to half of a dimension of a long side of the electronic device 21. For example, by considering an example in which the electronic device 21 is a folding dual-screen notebook computer, the dimension of the long side of the bluetooth keyboard is substantially equal to the dimension of the short side of the folding dual-screen notebook computer, and the dimension of the short side of the bluetooth keyboard is substantially equal to half of the dimension of the long side of the electronic device 21.

It can be understood that, by considering an example in which the electronic device 21 is the foldable dual-screen notebook computer, and the foldable dual-screen notebook computer includes a first screen and a second screen, in a case where a bluetooth keyboard that meets the above size specification is placed on the first screen or the second screen of the foldable dual-screen notebook computer, the bottom of the bluetooth keyboard is completely located on the first screen or the second screen, so as to avoid shaking of the bluetooth keyboard during typing by the user, which may improve the user experience.

Figure 5:
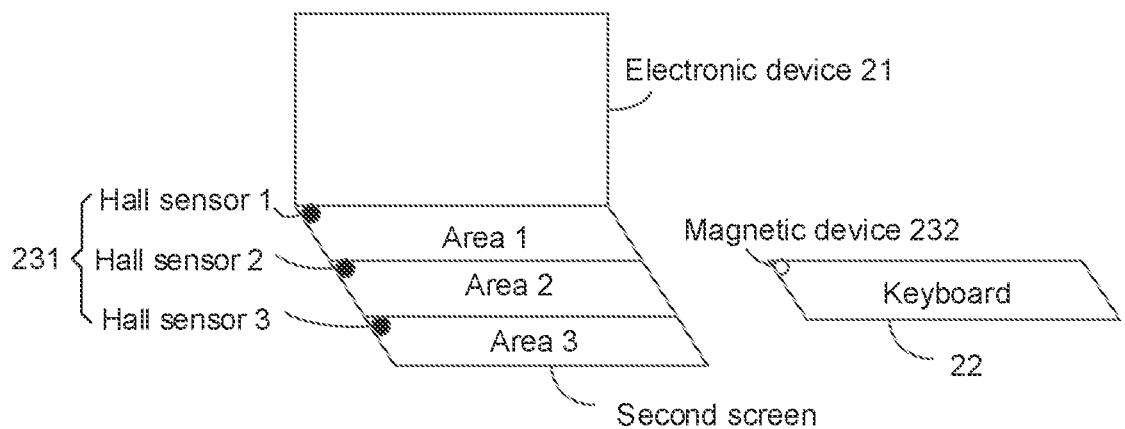
FIG. 5 is a structural diagram of another touch interaction device, in accordance with some embodiments.

In some embodiments, the sensing device(s) 23 include at least one Hall sensor, and a magnetic device provided corresponding to the Hall sensor. As shown in FIG. 5, the Hall sensor 231 and the magnetic device 232 may be provided on the electronic device 21 and the accessory device 22, respectively. For example, the Hall sensor is provided on the electronic device 21, and the magnetic device is provided at the bottom of the accessory device 22. Alternatively, the Hall sensor is provided at the bottom of the accessory device 22, and the magnetic device is provided on the electronic device 21.

In some embodiments, the number of the Hall sensor(s) may be the same as or different from the number of the magnetic device(s). For example, the number of Hall sensor(s) provided on the accessory device 22 may be less than or equal to the number of magnetic device(s) provided on the electronic device 21; alternatively, the number of magnetic device(s) provided on the accessory device 22 may be less than or equal to the number of Hall sensor(s) provided on the electronic device 21. The present disclosure does not limit the number of the Hall sensor(s) and the magnetic device(s) included in the touch interaction device 20.

In some embodiments, Hall sensor(s) or magnetic device(s) on the accessory device 22 may be provided at any position of an upper left corner, an upper right corner, a lower left corner and a lower right corner of the bottom of the accessory device 22. Magnetic device(s) or Hall sensor(s) on the electronic device 21 may be provided on both sides of the first screen or the second screen of the electronic device 21. The present disclosure does not limit the positions of the Hall sensor(s) and the magnetic device(s) included in the touch interaction device 20.

The following embodiments consider an example in which the Hall sensor(s) are provided on the electronic device 21 and the magnetic device(s) are provided at the bottom of the accessory device 22 to introduce solution provided by the embodiments of the present disclosure.

For example, as shown in FIG. 2, the accessory device 22 is a bluetooth keyboard, the electronic device 21 is a foldable dual-screen notebook computer, and the foldable dual-screen notebook computer includes a first screen and a second screen. In a case where the sensing device(s) 23 include one Hall sensor and one magnetic device, the magnetic device may be provided at an upper left corner of the bottom of the bluetooth keyboard, and the Hall sensor may be provided at a left side of the second screen of the foldable dual-screen notebook computer. When the bluetooth keyboard is placed on the second screen of the foldable dual-screen notebook computer, the Hall sensor on the foldable dual-screen notebook computer senses with the magnetic device on the bluetooth keyboard, and the Hall sensor generates a Hall voltage. The Hall sensor sends voltage value information to a system motherboard of the electronic device, the system motherboard receives the information and then transmits the information to a processor of the electronic device, and the processor may determine that the bluetooth keyboard is placed on the second screen of the foldable dual-screen notebook computer according to the information.

Figure 6:
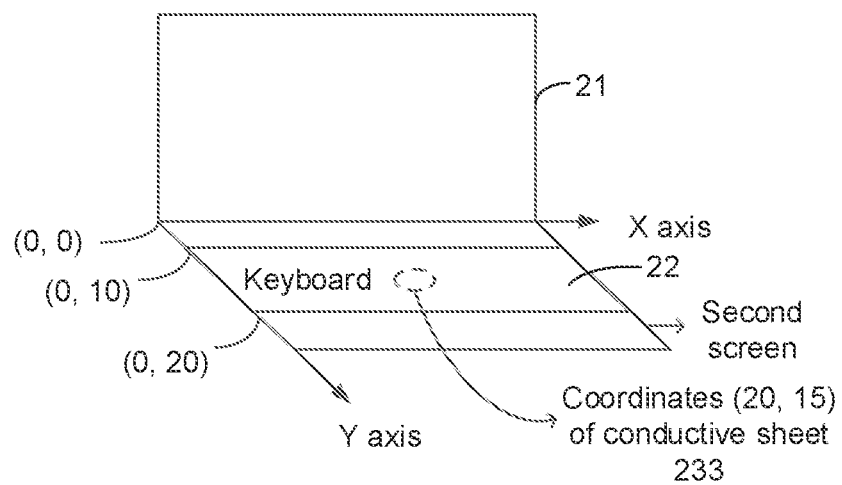
FIG. 6 is a schematic diagram of application of another touch interaction method, in accordance with some embodiments.

In some embodiments, the sensing device(s) 23 include at least one device having a conductive function. As shown in FIG. 6, the device 233 having the conductive function may be made of a polymer conductive material, or may be a metal with good conductivity (such as Cu or Ag).

For example, the device having the conductive function may adopt a sheet structure, a cylinder structure, or the like. Such a structure may increase a contact area between the sensing device 23 and the screen of the electronic device 21, enhance the sensing effect, and make it easy for the electronic device 21 to identify the sensing device 23.

In some embodiments, the device having the conductive function may be a conductive sheet. When the conductive sheet is provided at the bottom of the accessory device 22, the bottom of the accessory device 22 may be hollowed out, and the conductive sheet is arranged at the hollowed-out position. The conductive sheet is flush with the bottom of the accessory device 22, and the conductive sheet and the accessory device 22 are common-grounded, that is, the conductive sheet and the accessory device 22 share a ground wire together. That is to say, in a case where the sensing device(s) 23 include the device with the conductive function, the device with the conductive function may be arranged at the bottom of the accessory device 22, flush with the bottom of the accessory device 22, and are common-grounded with the accessory device 22. In this way, it may be ensured that when the accessory device 22 is placed on the screen of the electronic device 21, the sensing device at the bottom of the accessory device 22 can sense the screen of the electronic device 21.

For example, in a case where the sensing device(s) 23 include one device with a conductive function, the sensing device 23 may be arranged at a center point of the bottom of the accessory device 22, or may be arranged at any position of an upper left corner, an upper right corner, a lower left corner and a lower right corner of the bottom of the accessory device 22, or may be arranged at another position of the bottom of the accessory device 22. The present disclosure does not limit the number and arrangement positions of the device(s) with the conductive function included in the touch interaction device 20.

For example, as shown in FIG. 2, the accessory device 22 is a bluetooth keyboard, the electronic device 21 is a foldable dual-screen notebook computer, and the foldable dual-screen notebook computer includes a first screen and a second screen. In a case where the sensing device(s) 23 include one conductive sheet, the conductive sheet may be arranged at an upper left corner of the bottom of the bluetooth keyboard. When the bluetooth keyboard is placed on the second screen of the foldable dual-screen notebook computer, the conductive sheet at the bottom of the bluetooth keyboard senses the second screen of the foldable dual-screen notebook computer, and a capacitance value of the corresponding position of the second screen of the foldable dual-screen notebook computer changes. A processor of the electronic device 21 may determine that the bluetooth keyboard is placed on the second screen of the foldable dual-screen notebook computer according to the change in the capacitance value.

Figure 7:
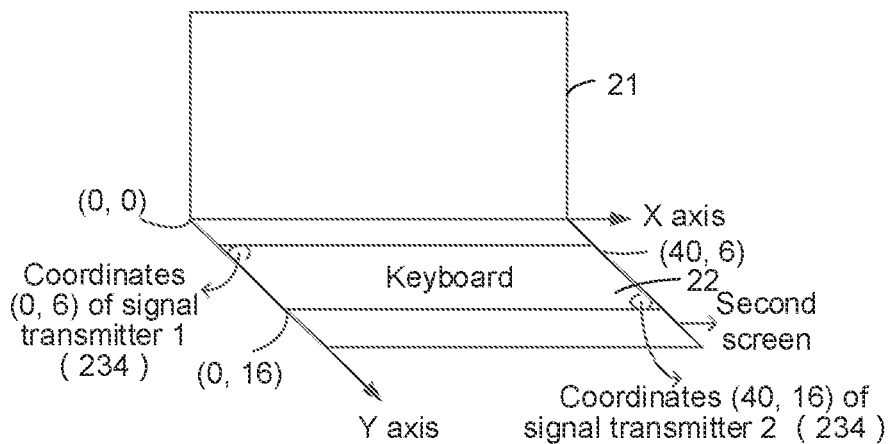
FIG. 7 is a schematic diagram of application of yet another touch interaction method, in accordance with some embodiments.

In some embodiments, the sensing device(s) 23 include at least one signal transmitter. As shown in FIG. 7, the signal transmitter 234 emits a unidirectional periodic excitation signal. The direction of the excitation signal is unique and always perpendicular to the bottom of the accessory device 22.

In some embodiments, when the signal transmitter is provided at the bottom of the accessory device 22, the signal transmitter may be directly attached to the bottom of the accessory device 22; alternatively, the bottom of the accessory device 22 may be hollowed out, and the signal transmitter is arranged at the hollowed-out position. That is to say, in a case where the sensing device(s) 23 include the signal transmitter, the signal transmitter may be arranged at the bottom of the accessory device 22. Moreover, when the accessory device 22 is placed on the screen of the electronic device 21, a signal emitted by the signal transmitter can be received by the screen of the electronic device 21.

For example, in a case where the sensing device(s) 23 include one signal transmitter, the sensing device 23 may be arranged at a center point of the bottom of the accessory device 22, or may be arranged at any position of an upper left corner, an upper right corner, a lower left corner and a lower right corner of the bottom of the accessory device 22, or may be arranged at another position of the bottom of the accessory device 22. The present disclosure does not limit the number and arrangement positions of the signal transmitter(s) included in the touch interaction device 20.

For example, as shown in FIG. 2, the accessory device 22 is a bluetooth keyboard, the electronic device 21 is a foldable dual-screen notebook computer, and the foldable dual-screen notebook computer includes a first screen and a second screen. In a case where the sensing device(s) 23 include one signal transmitter, the signal transmitter may be arranged at an upper left corner of the bottom of the bluetooth keyboard. When the bluetooth keyboard is placed on the second screen of the foldable dual-screen notebook computer, a touch panel of the second screen of the foldable dual-screen notebook computer senses and identifies the excitation signal emitted by the signal transmitter. A processor of the electronic device 21 may determine that the bluetooth keyboard is placed on the second screen of the foldable dual-screen notebook computer according to the excitation signal.

In some embodiments, the sensing device(s) 23 provided at the bottom of the accessory device 22 include at least two of Hall sensor(s), magnetic device(s), device(s) with a conductive function, and signal transmitter(s).

It can be understood that, the sensing device(s) are provided on the accessory device or both the accessory device and the electronic device in the embodiments of the present disclosure, so that the electronic device may determine whether the accessory device is placed on the electronic device according to the sensing information of the sensing device, so as to facilitate the electronic device to adjust the touch scanning frequency and display drive of the electronic device according to the screen shielding area, thereby reducing the power consumption of the electronic device.

Figure 3:
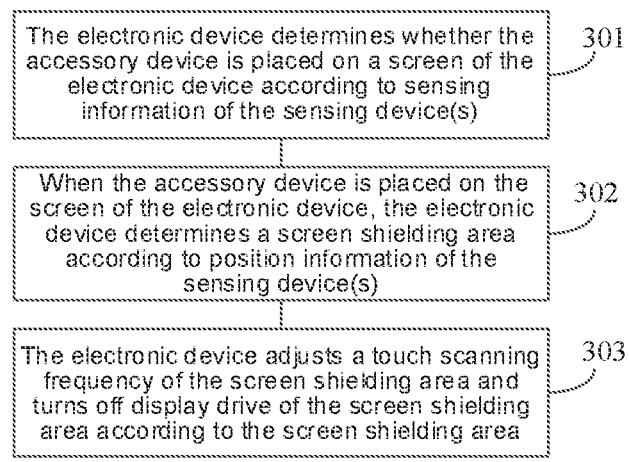
FIG. 3 is a flow diagram of a touch interaction method, in accordance with some embodiments.

Some embodiments of the present disclosure provide a touch interaction method, which is applied to the above touch interaction device. As shown in FIG. 3, the method includes steps 301 to 303. In the touch interaction method provided in the embodiments of the present disclosure, an electronic device may be the above electronic device 21, a sensing device may be the above sensing device 23, and an accessory device may be the above accessory device 22.

In step 301, the electronic device determines whether the accessory device is placed on a screen of the electronic device according to sensing information of the sensing device(s).

In some embodiments, in a case where the sensing device(s) include at least one Hall sensor and at least one magnetic device, the sensing information of the sensing device(s) is a voltage value.

Figure 4:
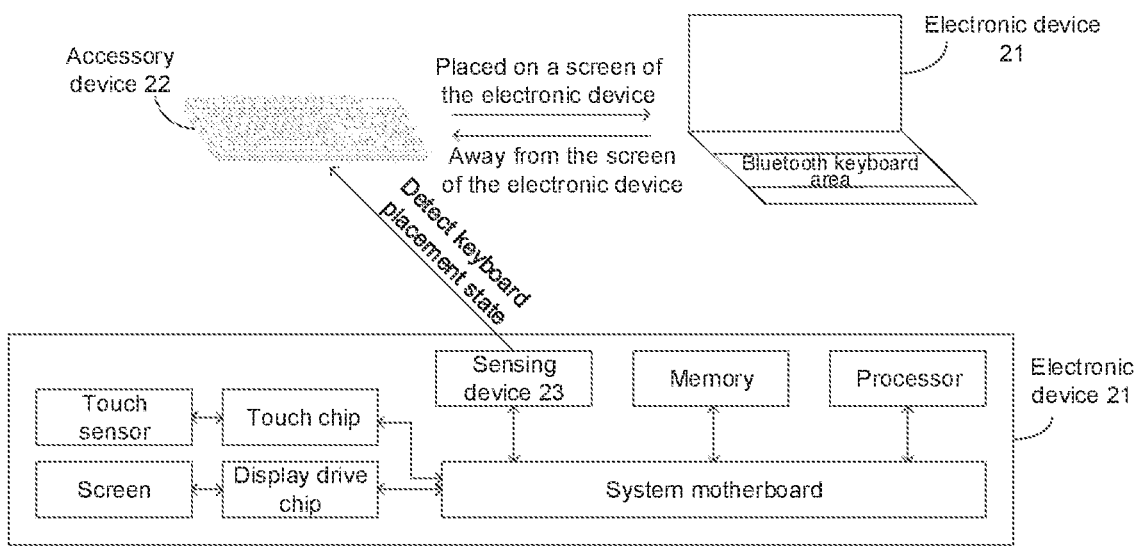
FIG. 4 is a schematic diagram of application of a touch interaction method, in accordance with some embodiments.

For example, the sensing device(s) 23 include Hall sensor(s) and magnetic device(s). As shown in FIG. 4, when the Hall sensor senses with the magnetic device, the Hall sensor generates a Hall voltage. The Hall sensor sends voltage value information to a system motherboard of the electronic device 21. The system motherboard receives the sensing information and then transmits the sensing information to a processor of the electronic device 21, and the processor may determine that the accessory device 22 is placed on the screen of the electronic device 21 according to the sensing information. For example, when the processor of the electronic device 21 detects that a voltage value of at least one Hall sensor is at a high level, it is determined that the accessory device 22 is placed on the screen of the electronic device 21; and when the processor of the electronic device 21 detects that voltage value(s) of all Hall sensors are at low levels, it is determined that the accessory device 22 is far away from the screen of the electronic device 21.

In some embodiments, in a case where the sensing device(s) are at least one device having a conductive function, the sensing information of the sensing device(s) is a capacitance value. The following embodiments will be illustrated exemplarily by considering an example in which the device having the conductive function is a conductive sheet.

For example, the sensing device(s) 23 include at least one conductive sheet. As shown in FIG. 4, when the at least one conductive sheet is placed on the screen of the electronic device 21, the conductive sheet senses with the screen of the electronic device 21. A capacitance value of a position on the screen of the electronic device 21 in contact with the conductive sheet changes. A processor of the electronic device 21 determines that the accessory device 22 is placed on the screen of the electronic device 21 according to the change of the capacitance value. When the electronic device 21 detects that a capacitance value of at least one position on the screen of the electronic device 21 changes and becomes larger, the electronic device 21 determines that the accessory device 22 is placed on the screen of the electronic device 21. When the electronic device 21 detects that a capacitance value of at least one position on the screen of the electronic device 21 changes and becomes smaller, the electronic device 21 determines that the accessory device 22 is away from the screen of the electronic device 21.

It will be noted that since information such as the size and material of the conductive sheet is known, a range in the capacitance value when the conductive sheet sensing with the screen of the electronic device is also known. Therefore, the electronic device may determine, according to the change in the capacitance value, that the conductive sheet is placed on the screen of the electronic device. In addition, a contact area between the conductive sheet and the screen of the electronic device is larger than a contact area between the user's finger and the screen of the electronic device, so that the electronic device may distinguish between finger touch and conductive sheet touch according to the capacitance value. When the capacitance value has a large change or the range in the capacitance value is within a predicted range, it is determined that the conductive sheet is in contact with the screen of the electronic device, thereby determining that the accessory device is placed on the electronic device. When the capacitance value has a small change, it is determined that the user's finger is in contact with the screen of the electronic device.

In some embodiments, in a case where the sensing device(s) are at least one signal transmitter, the sensing information of the sensing device(s) is an excitation signal emitted by the signal transmitter.

For example, the sensing device(s) 23 include at least one signal transmitter. As shown in FIG. 4, when the at least one signal transmitter is placed on the screen of the electronic device 21, a touch panel of the electronic device 21 senses an excitation signal emitted by the signal transmitter. A processor of the electronic device 21 determines that the accessory device 22 is placed on the screen of the electronic device 21 according to the excitation signal. When the electronic device 21 identifies at least one excitation signal, the electronic device 21 determines that the accessory device 22 is placed on the screen of the electronic device 21. When the electronic device 21 does not identify any excitation signal, the electronic device 21 determines that the accessory device 22 is far away from the screen of the electronic device 21.

In step 302, when the accessory device is placed on the screen of the electronic device, the electronic device determines a screen shielding area according to position information of the sensing device(s).

The screen shielding area is an area of the screen of the electronic device blocked by the accessory device.

In some embodiments, before the above step 302, the method may further include that the electronic device obtains a size of the accessory device (e.g., a keyboard) and position information of the sensing device(s) at the bottom of the accessory device. The size of the accessory device and the position information of the sensing device(s) at the bottom of the accessory device may be pre-set in the electronic device by the user. Correspondingly, the above step 302 may include that the electronic device determines the screen shielding area according to the position information of the sensing device(s), the size of the accessory device, and the position information of the sensing device(s) at the bottom of the accessory device. It can be understood that when the electronic device calculates the screen shielding area in combination with the size of the accessory device and the position information of the sensing device(s) at the bottom of the accessory device, it may not only improve the accuracy of the calculation result of the screen shielding area, but also reduce the number of the sensing device(s) provided at the bottom of the accessory device.

In some embodiments, in a case where the sensing device(s) include Hall sensor(s) and magnetic device(s), the screen of the electronic device may be pre-divided into one or more preset areas, each preset area corresponds to a control instruction, and the control instruction is used to turn off touch scanning and display drive of the corresponding preset area. Each preset area includes at least one sensing device. For example, each preset area includes at least one Hall sensor or at least one magnetic device.

For example, the one or more preset areas may be obtained by division according to the size of the accessory device, the number and position(s) of the sensing device(s) provided on the electronic device, and other parameters. For example, the user may divide the screen of the foldable dual-screen electronic device into one or more preset areas according to a size of the bluetooth keyboard, the number and positions of the Hall sensor(s) provided on the foldable dual-screen electronic device, and input division information of the one or more preset areas into the electronic device.

The embodiments of the present disclosure do not limit the size of each preset area in the one or more preset areas. The size of the preset area may be smaller than the size of the accessory device, or equal to the size of the accessory device, or larger than the size of the accessory device.

For example, the screen of the electronic device may be divided into n preset areas in advance, and the n preset areas are respectively represented by area 1, area 2, . . . , and area n. Each preset area corresponds to a control instruction, and the control instruction may be represented by a binary number with three bits.

In some embodiments, when the accessory device leaves the screen of the electronic device, it may also correspond to a control instruction, which is used to restore the touch scanning frequency of the screen shielding area and turn on the display drive of the screen shielding area.

For example, the corresponding relationship between a state of the accessory device (e.g. a keyboard), a control instruction, and a touch scanning and display state of the screen may be shown in Table 1.

TABLE 1

| State of keyboard | Control instruction | State of touch scanning and display of screen |
|---|---|---|
| Keyboard away from the screen | 000 | Touch scanning and display of full screen working normally |
| Keyboard placed on area 1 of the screen | 001 | Turning off touch scanning and display of area 1 of the screen |
| Keyboard placed on area 2 of the screen | 010 | Turning off touch scanning and display of area 2 of the screen |
| . . . | . . . | . . . |
| Keyboard placed on area n of the screen | 111 | Turning off touch scanning and display of area n of the screen |

For example, the accessory device is a keyboard. As shown in Table 1, when the keyboard is placed on area 1 of the screen of the electronic device, a control instruction 001 is used to turn off touch scanning and display of area 1 of the screen of the electronic device. When the keyboard is placed on area 2 on the screen of the electronic device, a control instruction 010 is used to turn off touch scanning and display of area 2 of the screen of the electronic device, and so on. When the keyboard leaves the screen of the electronic device, a control instruction 000 is used to restore the touch scanning frequency of the screen shielding area and turn on the display drive of the screen shielding area. In this case, the touch scanning and display of the screen of the electronic device work normally.

The screen shielding area determined in step 302 may include at least one preset area. For example, when the keyboard is placed on the screen of the electronic device, the screen shielding area may include area 1. For another example, when the keyboard is placed on the screen of the electronic device, the screen shielding area may include area 1 and area 2. The present disclosure does not limit the number of the preset area(s) included in the screen shielding area, and the number of preset area(s) included in the screen shielding area is related to parameters such as the division method of the preset areas and the placement position of the keyboard.

In some embodiments, in a case where the sensing device(s) include at least one Hall sensor and at least one magnetic device, and the accessory device is placed on the screen of the electronic device, Hall sensor and magnetic device generate induction, and the electronic device may determine the screen shielding area according to a preset area corresponding to a Hall sensor that generates induction. The present disclosure does not limit the size of the keyboard and the position of the keyboard placed on the screen of the electronic device. The following embodiments will be illustrated exemplarily by considering an example in which a dimension of a long side of the keyboard is 40 cm, a dimension of a short side is 10 cm, and the keyboard is placed on the second screen of the electronic device.

For example, the sensing device(s) include at least one Hall sensor and at least one magnetic device, and the Hall sensor is provided on the electronic device. The above description of the electronic device determining the screen shielding area according to the position information of the sensing device(s) may include that the electronic device determines the screen shielding area according to at least one of the positions of the Hall sensor(s) that generate induction, the preset area(s) corresponding to the Hall sensor(s), the position of the magnetic device(s) provided at the bottom of the accessory device, and the size of the accessory device.

For example, the sensing device(s) include one Hall sensor and one magnetic device, the accessory device is a keyboard, the Hall sensor is provided at a central point of a left side of the second screen of the electronic device, the magnetic device is provided at a upper left corner of the bottom of the keyboard, the second screen of the electronic device is divided as a single preset area 1, and a size of the preset area 1 is the same as that of the accessory device. When the keyboard is placed on the electronic device, the Hall sensor on the electronic device senses with the magnetic device at the bottom of the keyboard. The electronic device may determine the screen shielding area according to the position of the Hall sensor that generates induction, and the screen shielding area is the preset area 1.

For example, as shown in FIG. 5, the sensing device(s) include three Hall sensors and one magnetic device, the accessory device is a keyboard, the second screen of the electronic device is divided into three preset areas including area 1, area 2 and area 3, a size of each preset area is the same as that of the accessory device, the Hall sensors are each provided at an upper left corner of each preset area, and the magnetic device is provided at an upper left corner of the bottom of the keyboard. When the keyboard is placed on the electronic device, if the magnetic device at the bottom of the keyboard senses with a Hall sensor 1 on the electronic device, the electronic device may determine that the screen shielding area is a preset area (area 1) corresponding to the Hall sensor 1 according to the position of the Hall sensor 1 and the magnetic device being provided at the upper left corner of the bottom of the keyboard.

In some embodiments, as shown in FIG. 4, in a case where the sensing device(s) include at least one conductive sheet, the accessory device is a keyboard, and the keyboard is placed on the screen of the electronic device, the conductive sheet senses with the screen of the electronic device. A touch chip of the electronic device calculates position coordinates of the conductive sheet on the screen of the electronic device, and a processor of the electronic device determines the screen shielding area in combination with the size of the keyboard and the position of the conductive sheet at the bottom of the keyboard. The present disclosure does not limit establishment of a coordinate system of the screen and the number and position(s) of the conductive sheet(s). The following embodiments will be illustrated exemplarily by considering an example in which the coordinate system of the screen is established with the folding line as a positive x-axis and a side, perpendicular to the folding line, of the second screen as a positive y-axis.

For example, as shown in FIG. 6, the sensing device(s) are a conductive sheet, and the conductive sheet is provided at the center of the bottom of the keyboard. When the keyboard is placed on the electronic device, the touch chip of the electronic device may determine that the coordinates of the conductive sheet on the screen are (20, 15), and the processor calculates that coordinates of an upper left vertice, a lower left vertice, an upper right vertice and a lower right vertice of the screen shielding area are respectively (0, 10), (0, 20), (40, 10) and (40, 20) according to the size of the keyboard and the center position of the conductive sheet at the bottom of the keyboard.

In some embodiments, in a case where the sensing device(s) include at least one signal transmitter, the accessory device is a keyboard, and the keyboard is placed on the screen of the electronic device, the signal transmitter senses with the screen of the electronic device. A touch chip of the electronic device calculates position coordinates of the signal transmitter on the screen, and a processor of the electronic device determines the screen shielding area in combination with the size of the keyboard and the position of the signal transmitter at the bottom of the keyboard. The present disclosure does not limit establishment of a coordinate system of the screen and the number and position(s) of the signal transmitter(s). The following embodiments will be illustrated exemplarily by considering an example in which the coordinate system of the screen is established with the folding line as a positive x-axis and a side, perpendicular to the folding line, of the second screen as a positive y-axis.

For example, as shown in FIG. 7, the sensing device(s) are two signal transmitters, which are a signal transmitter 1 and a signal transmitter 2, the signal transmitter 1 is provided at an upper left corner of the bottom of the keyboard, and the signal transmitter 2 is provided at a lower right corner of the bottom of the keyboard. When the keyboard is placed on the electronic device, the touch chip of the electronic device may determine that the coordinates of the signal transmitter 1 on the screen are (0, 6), and the coordinates of the signal transmitter 2 on the screen are (40, 16), and the processor calculates that coordinates of an upper left vertice, a lower left vertice, an upper right vertice and a lower right vertice of the screen shielding area are respectively (0, 6), (0, 16), (40, 6) and (40, 16) according to the size of the keyboard and the upper left corner and lower right corner positions of the signal transmitters at the bottom of the keyboard.

In step 303, the electronic device adjusts a touch scanning frequency of the screen shielding area and turns off display drive of the screen shielding area according to the screen shielding area.

In some embodiments, the electronic device includes a processor, a touch chip, and a display drive chip. In a case where the sensing device(s) include at least one Hall sensor and at least one magnetic device, the step 303 includes that the processor sends, according to at least one preset area included in the screen shielding area, at least one control instruction in one-to-one correspondence to the at least one preset area to the touch chip and the display drive chip; the touch chip turns off touch scanning of the at least one preset area corresponding to the at least one control instruction according to the at least one control instruction; and the display drive chip turns off display drive of the at least one preset area corresponding to the at least one control instruction according to the at least one control instruction.

For example, the Hall sensor is provided on the electronic device, the magnetic device is provided at the bottom of the keyboard, and the screen shielding area includes a single preset area. The processor may determine a control instruction corresponding to the preset area according to the preset area included in the screen shielding area, and send information of the preset area and the control instruction to a system motherboard. The system motherboard transmits the information and the control instruction sent by the processor to the touch chip and display drive chip. The touch chip turns off the touch scanning of the screen shielding area according to the control instruction, and the display drive chip turns off the display drive of the screen shielding area according to the control instruction.

It can be understood that, when the accessory device is placed on the screen of the electronic device, the screen of the electronic device cannot be operated due to being blocked by the accessory device. Therefore, turning off the touch scanning and the display drive of the screen shielding area may reduce the power consumption of the electronic device.

It will be noted that in a case where the sensing device(s) are Hall sensor(s) and magnetic device(s), sensing information is generated between a Hall sensor and a magnetic device, and the screen of the electronic device does not participate in the sensing. Therefore, even if the touch scanning of the screen shielding area is turned off, the electronic device may still sense the departure of the accessory device according to the information of the sensor when the accessory device leaves the screen of the electronic device.

For example, in a case where the screen shielding area includes preset areas (area 1 and area 2), in combination with Table 1, the processor determines control instructions as 001 and 010 respectively according to the preset areas (area 1 and area 2), and the processor sends that the screen shielding area includes area 1 and area 2 to the system motherboard, and sends that the control instructions 001 and 010. The system motherboard transmits the above information to the touch chip and display drive chip. The touch chip turns off touch scanning of the preset areas (area 1 and area 2) respectively according to the control instructions 001 and 010, and the display drive chip turns off display drive of the preset areas (area 1 and area 2) respectively according to the control instructions 001 and 010.

In some embodiments, in a case where the sensing device(s) are at least one conductive sheet or at least one signal transmitter, the processor transmits the control instruction to the touch chip through the system motherboard, and the touch chip reduces touch scanning frequency of the screen shielding area, so as to reduce the power consumption of electronic device. The processor transmits the control instruction to the display drive chip through the system motherboard, and the display drive chip turns off display drive of the screen shielding area. It can be understood that, since the sensing information of the conductive sheet and the sensing information of the signal transmitter are identified by the touch panel, when the screen of the electronic device is blocked by the accessory device, the area that is blocked still needs to be performed touch scanning to track the placement state of the accessory device, but a low-frequency scanning may be performed to reduce the power consumption. Therefore, when the accessory device leaves the screen of the electronic device, the electronic device may sense the departure of the accessory device.

It can be understood that in the touch interaction method provided by the embodiments of the present disclosure, at least one of a Hall sensor, a magnetic device, a device with a conductive function, and a signal transmitter is provided at the bottom of the accessory device, so that the electronic device may identify whether the accessory device is placed on the screen of the electronic device according to the sensing information of the sensing device(s). Moreover, when the accessory device is placed on the screen of the electronic device, the power consumption of the electronic device may be reduced by adjusting the touch scanning frequency and display drive of the screen shielding area of the electronic device.

Figure 8:
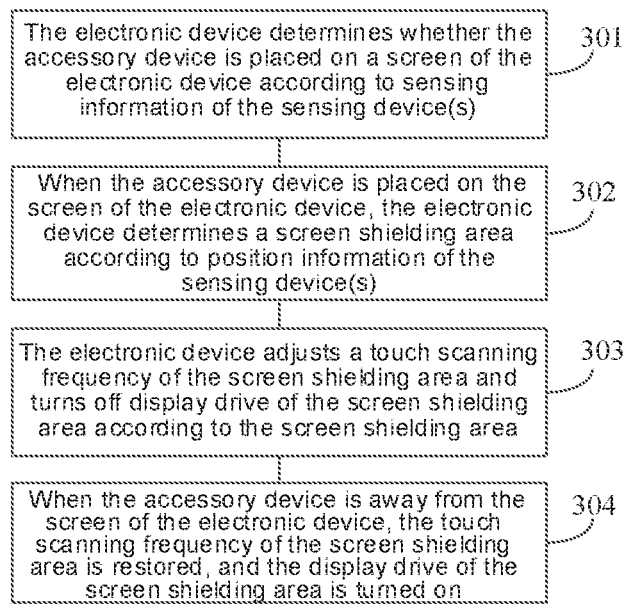
FIG. 8 is a flow diagram of another touch interaction method, in accordance with some embodiments.

As shown in FIG. 8, in addition to the above steps 301 to 303, the touch interaction method provided in some embodiments of the present disclosure may further include a step 304.

In step 304, when the accessory device is away from the screen of the electronic device, the touch scanning frequency of the screen shielding area is restored, and the display drive of the screen shielding area is turned on.

In some embodiments, in a case where the sensing device (s) are at least one Hall sensor and at least one magnetic device, when the keyboard is away from the screen of the electronic device, the Hall sensor sends information with a voltage value of 0 to the system motherboard of the electronic device, and the system motherboard receives the information and transmits the information to the processor. The processor determines that the keyboard is away from the screen according to the information, and sends a control instruction corresponding to the keyboard being away from the screen to the touch chip and the display drive chip, so as to restore the touch scanning frequency of the screen shielding area and turn on the display drive of the screen shielding area.

For example, when the keyboard is away from the screen, in combination with Table 1, the processor sends the control instruction 000 corresponding to the keyboard being away from the screen to the touch chip and the display drive chip, so as to restore the touch scanning frequency of the screen shielding area and turn on the display drive of the screen shielding area.

In some embodiments, in a case where the sensing device(s) are at least one conductive sheet, when the bluetooth keyboard is away from the screen of the electronic device, after the touch chip of the electronic device detects a change in the capacitance value, the touch chip sends a trigger signal to the system motherboard, and the trigger signal is used for restoring touch scanning and display drive of the screen. The system motherboard receives the trigger signal and sends a control instruction to the touch chip and the display drive chip, so as to restore the touch scanning frequency of the screen shielding area and turn on the display drive of the screen shielding area.

In some embodiments, in a case where the sensing device(s) are at least one signal transmitter, when the bluetooth keyboard is away from the screen of the electronic device, the touch chip of the electronic device cannot recognize any excitation signal. The touch chip sends a trigger signal to the system motherboard, and the trigger signal is used for restoring touch scanning and display drive of the screen. The system motherboard receives the trigger signal and sends a control instruction to the touch chip and the display drive chip, so as to restore the touch scanning frequency of the screen shielding area and turn on the display drive of the screen shielding area.

Figure 9:
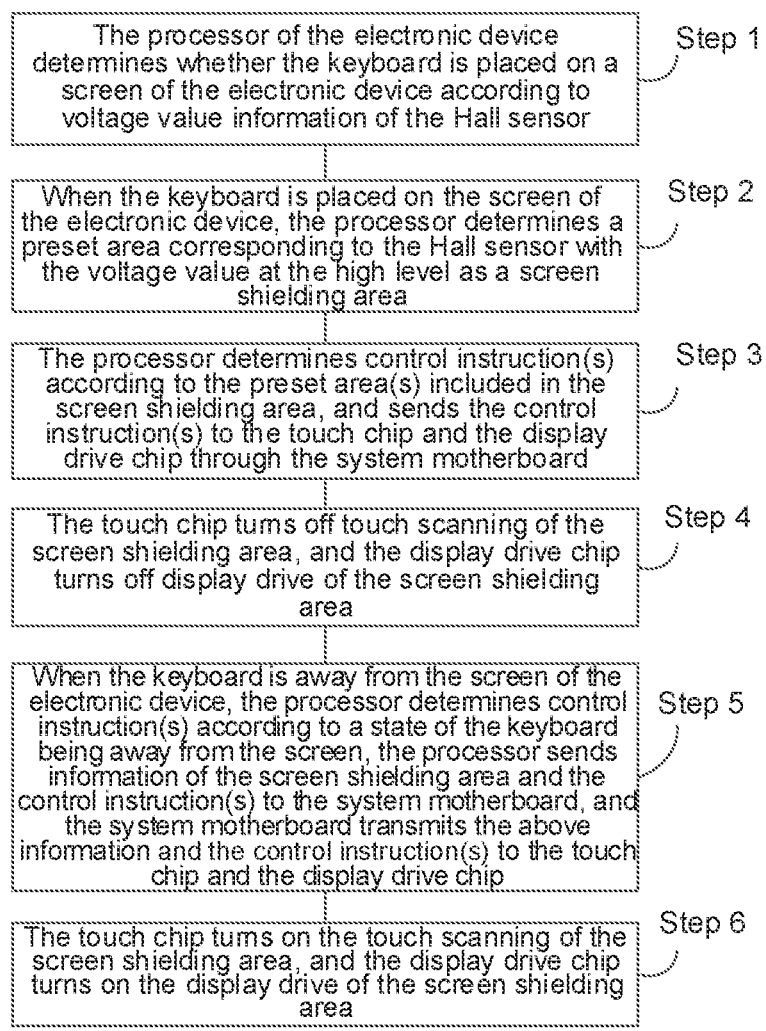
FIG. 9 is a flow diagram of yet another touch interaction method, in accordance with some embodiments.

Some embodiments of the present disclosure provide a touch interaction method, and the touch interaction method is applied to the above touch interaction device. The sensing device(s) in the touch interaction device include at least one Hall sensor and at least one magnetic device, the accessory device in the touch interaction device is a keyboard, and the electronic device in the touch interaction device includes a processor, a system motherboard, a touch chip and a display drive chip. As shown in FIG. 9, the touch interaction method includes steps 1 to 6.

In step 1, the processor of the electronic device determines whether the keyboard is placed on a screen of the electronic device according to voltage value information of the Hall sensor.

If the processor detects that the voltage value of at least one Hall sensor is at a high level, it is determined that the keyboard is placed on the screen of the electronic device, and then steps 2 to 4 are proceeded.

In step 2, when the keyboard is placed on the screen of the electronic device, the processor determines a preset area corresponding to the Hall sensor with the voltage value at the high level as a screen shielding area.

The screen shielding area may include at least one preset area.

In step 3, the processor determines control instruction(s) according to the preset area(s) included in the screen shielding area, and sends the control instruction(s) to the touch chip and the display drive chip through the system motherboard.

In step 4, the touch chip turns off touch scanning of the screen shielding area, and the display drive chip turns off display drive of the screen shielding area.

After step 4, if the processor detects that the voltage value(s) of all Hall sensor(s) are each at a low level, it is determined that the keyboard is away from the screen of the electronic device, and then steps 5 to 6 are proceeded.

In step 5, when the keyboard is away from the screen of the electronic device, the processor determines control instruction(s) according to a state of the keyboard being away from the screen, the processor sends information of the screen shielding area and the control instruction(s) to the system motherboard, and the system motherboard transmits the above information and the control instruction(s) to the touch chip and the display drive chip.

In step 6, the touch chip turns on the touch scanning of the screen shielding area, and the display drive chip turns on the display drive of the screen shielding area.

Figure 10:
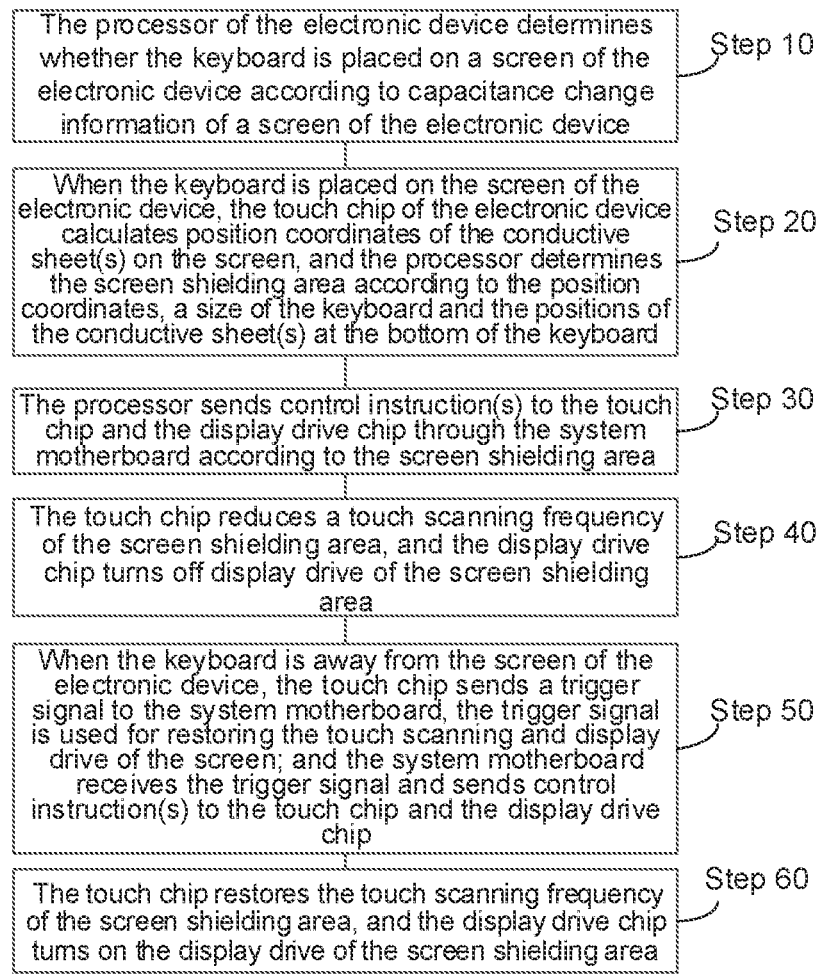
FIG. 10 is a flow diagram of yet another touch interaction method, in accordance with some embodiments.

Some embodiments of the present disclosure provide a touch interaction method, and the touch interaction method is applied to the above touch interaction device. The sensing device(s) in the touch interaction device include at least one conductive sheet, the accessory device in the touch interaction device is a keyboard, and the electronic device in the touch interaction device includes a processor, a system motherboard, a touch chip and a display drive chip. As shown in FIG. 10, the touch interaction method includes steps 10 to 60.

In step 10, the processor of the electronic device determines whether the keyboard is placed on a screen of the electronic device according to capacitance change information of a screen of the electronic device.

If the electronic device detects that a capacitance value of at least one position on the screen of the electronic device changes and becomes larger, the electronic device determines that the keyboard is placed on the screen, and then steps 20 to 40 are proceeded.

In step 20, when the keyboard is placed on the screen of the electronic device, the touch chip of the electronic device calculates position coordinates of the conductive sheet(s) on the screen, and the processor determines the screen shielding area according to the position coordinates, a size of the keyboard and the positions of the conductive sheet(s) at the bottom of the keyboard.

In step 30, the processor sends control instruction(s) to the touch chip and the display drive chip through the system motherboard according to the screen shielding area.

In step 40, the touch chip reduces a touch scanning frequency of the screen shielding area, and the display drive chip turns off display drive of the screen shielding area.

After step 40, if the electronic device detects that the capacitance value of the at least one position on the screen of the electronic device changes and becomes smaller, it is determined that the keyboard is away from the screen of the electronic device, and then steps 50 to 60 are proceeded.

In step 50, when the keyboard is away from the screen of the electronic device, the touch chip sends a trigger signal to the system motherboard, the trigger signal is used for restoring the touch scanning and display drive of the screen; and the system motherboard receives the trigger signal and sends control instruction(s) to the touch chip and the display drive chip.

In step 60, the touch chip restores the touch scanning frequency of the screen shielding area, and the display drive chip turns on the display drive of the screen shielding area.

Figure 11:
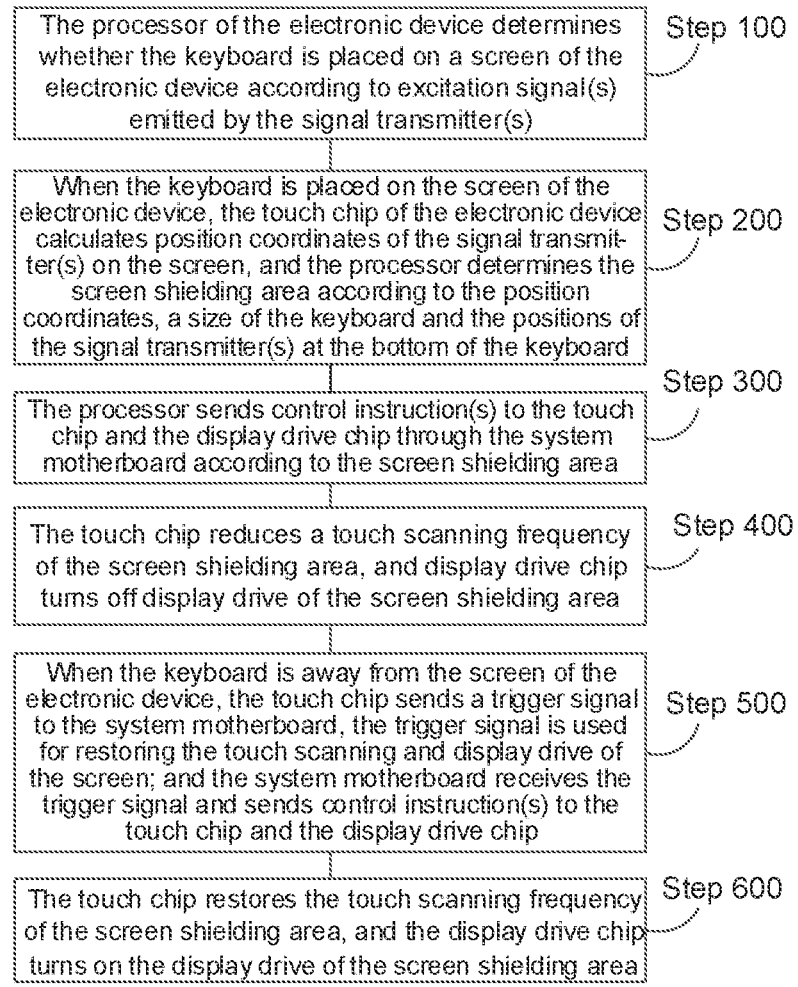
FIG. 11 is a flow diagram of yet another touch interaction method, in accordance with some embodiments.

Some embodiments of the present disclosure provide a touch interaction method, and the touch interaction method is applied to the above touch interaction device. The sensing device(s) in the touch interaction device include at least one signal transmitter, the accessory device in the touch interaction device is a keyboard, and the electronic device in the touch interaction device includes a processor, a system motherboard, a touch chip and a display drive chip. As shown in FIG. 11, the touch interaction method includes steps 100 to 600.

In step 100, the processor of the electronic device determines whether the keyboard is placed on a screen of the electronic device according to excitation signal(s) emitted by the signal transmitter(s).

If the electronic device senses and identifies at least one excitation signal, the electronic device determines that the keyboard is placed on the screen of the electronic device, and then steps 200 to 400 are proceeded.

In step 200, when the keyboard is placed on the screen of the electronic device, the touch chip of the electronic device calculates position coordinates of the signal transmitter(s) on the screen, and the processor determines the screen shielding area according to the position coordinates, a size of the keyboard and the positions of the signal transmitter(s) at the bottom of the keyboard.

In step 300, the processor sends control instruction(s) to the touch chip and the display drive chip through the system motherboard according to the screen shielding area.

In step 400, the touch chip reduces a touch scanning frequency of the screen shielding area, and display drive chip turns off the display drive of the screen shielding area.

After step 400, if the electronic device cannot recognize any excitation signal, it is determined that the keyboard is away from the screen of the electronic device, and then steps 500 to 600 are proceeded.

In step 500, when the keyboard is away from the screen of the electronic device, the touch chip sends a trigger signal to the system motherboard, the trigger signal is used for restoring the touch scanning and display drive of the screen; and the system motherboard receives the trigger signal and sends control instruction(s) to the touch chip and the display drive chip.

In step 600, the touch chip restores the touch scanning frequency of the screen shielding area, and the display drive chip turns on the display drive of the screen shielding area.

Figure 12:
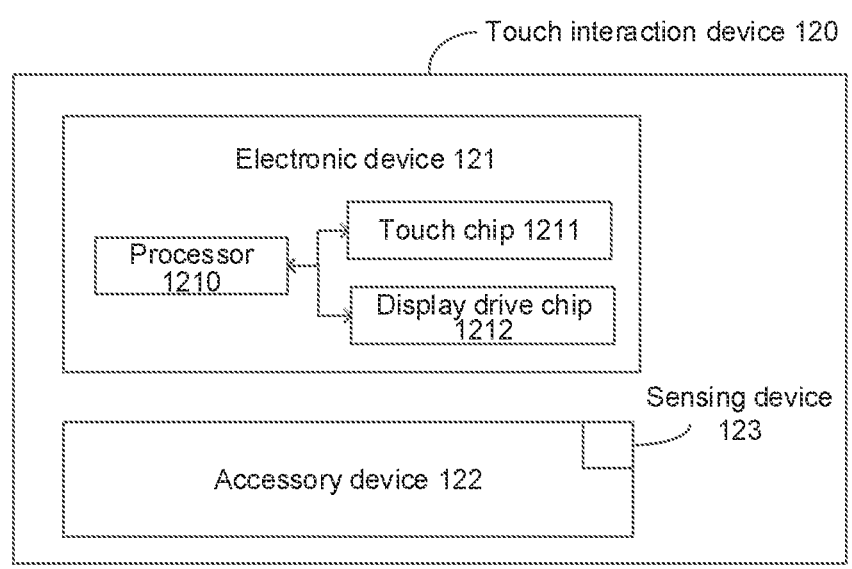
FIG. 12 is a structural diagram of yet another touch interaction device, in accordance with some embodiments.

Some embodiments of the present disclosure provide a touch interaction device 120. As shown in FIG. 12, the touch interaction device includes an electronic device 21 which includes a processor 1210, a touch chip 1211 and a display drive chip 1212, an accessory device 122 subordinate to the electronic device 121, and at least one sensing device 123. The sensing device(s) are provided at a bottom of the accessory device; alternatively, the sensing device(s) are provided at the bottom of the accessory device and on the electronic device.

The electronic device is configured to: determine whether the accessory device is placed on a screen of the electronic device according to sensing information of the sensing device(s); determine a screen shielding area according to position information of the sensing device(s) when the accessory device is placed on the screen of the electronic device, the screen shielding area being an area of a screen of the electronic device blocked by the accessory device; and adjust a touch scanning frequency of the screen shielding area and turn off display drive of the screen shielding area according to the screen shielding area.

In some embodiments, the sensing device(s) include at least one Hall sensor, and a magnetic device corresponding to the Hall sensor. The Hall sensor is provided on the electronic device, and the magnetic device is provided at the bottom of the accessory device. Alternatively, the Hall sensor is provided at the bottom of the accessory device, and the magnetic device is provided on the electronic device.

The electronic device is configured to turn off the touch scanning of the screen shielding area according to the screen shielding area.

In some embodiments, the screen of the electronic device include one or more preset areas, each preset area corresponds to a control instruction, and the control instruction is used to turn off the touch scanning and display drive of the preset area. Each preset area includes at least one sensing device, and the screen shielding area includes at least one preset area. The electronic device includes the processor, the touch chip and the display drive chip.

The processor is configured to, according to at least one preset area, send at least one control instruction in one-to-one correspondence to the at least one preset area to the touch chip and the display drive chip.

The touch chip is configured to, according to the at least one control instruction, turn off touch scanning of the at least one preset area corresponding to the at least one control instruction.

The display drive chip is configured to, according to the at least one control instruction, turn off the display drive of the at least one preset area corresponding to the at least one control instruction.

In some embodiments, the sensing device(s) are provided at the bottom of the accessory device, and the sensing device(s) include at least one of at least one device having a conductive function and at least one signal transmitter.

The electronic device is configured to reduce the touch scanning frequency of the screen shielding area according to the screen shielding area.

The electronic device is further configured to, when it is determined that the accessory device is away from the screen of the electronic device, restore the touch scanning frequency of the screen shielding area and turn on the display drive of screen shielding area.

In some embodiments, the screen of the electronic device is a foldable screen, and the accessory device includes a keyboard. A dimension of a long side of the keyboard is smaller than or equal to a dimension of a short side of the electronic device, and a dimension of a short side of the keyboard is less than or equal to half of a dimension of a long side of the electronic device. The short sides of the electronic device are parallel to a folding line of the electronic device, and the long sides of the electronic device are perpendicular to the folding line of the electronic device.

Some embodiments of the present disclosure provide a computer-readable storage medium (e.g., a non-transitory computer-readable storage medium). The computer-readable storage medium has stored computer program instructions thereon, and the computer program instructions, when run on a computer (e.g., a touch interaction device), cause the computer to perform the touch interaction method in any of the above embodiments.

For example, the computer-readable storage medium may include, but is not limited to, a magnetic storage device (e.g., a hard disk, a floppy disk or a magnetic tape), an optical disk (e.g., a compact disk (CD), a digital versatile disk (DVD)), a smart card, a flash memory device (e.g., an erasable programmable read-only memory (EPROM), a card, a stick or a key driver). Various computer-readable storage media described in the present disclosure may represent one or more devices and/or other machine-readable storage media, which are used for storing information. The term "machine-readable storage medium" may include, but is not limited to, wireless channels and various other media capable of storing, containing and/or carrying instructions and/or data.

Some embodiments of the present disclosure further provide a computer program product. The computer program product is, for example, stored on a non-transitory computer-readable storage medium. The computer program product includes computer program instructions that, when executed by a computer (e.g., a touch interaction device), cause the computer to perform the touch interaction method as described in the above embodiments.

Some embodiments of the present disclosure further provide a computer program. When executed by a computer (e.g., a touch interaction device), the computer program causes the computer to perform the touch interaction method as described in the above embodiments.

Beneficial effects of the computer-readable storage medium, the computer program product, and the computer program are the same as the beneficial effects of the touch interaction method as described in some of the above embodiments, and are not repeated herein. The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A touch interaction device, comprising an electronic device including a screen, an accessory device subordinate to the electronic device, and at least one sensing device, wherein the at least one sensing device is disposed in one of following ways:
the at least one sensing device is disposed at a bottom of the accessory device, and
the at least one sensing device is disposed at the bottom of the accessory device and on the electronic device; and
the electronic device is configured to:
determine whether the accessory device is placed on the screen of the electronic device according to sensing information of the at least one sensing device;
determine a screen shielding area according to position information of the at least one sensing device in a case where the accessory device is placed on the screen of the electronic device, the screen shielding area being an area of the screen of the electronic device blocked by the accessory device; and
adjust touch scanning frequency of the screen shielding area and turn off display drive of the screen shielding area according to the screen shielding area;
wherein the at least one sensing device includes at least one Hall sensor and a magnetic device corresponding to the Hall sensor;
wherein the screen of the electronic device includes two or more preset areas, each preset area corresponds to a control instruction, and the control instruction is used for turning off touch scanning and display drive of the preset area; each preset area includes at least one of the at least one sensing device, the screen shielding area includes at least one preset area, and the electronic device includes a processor, a touch chip and a display drive chip;
the processor is configured to send at least one control instruction in one-to-one correspondence to the at least one preset area to the touch chip and the display drive chip according to the at least one preset area;
the touch chip is configured to, according to the at least one control instruction, turn off touch scanning of the at least one preset area corresponding to the at least one control instruction; and
the display drive chip is configured to, according to the at least one control instruction, turn off display drive of the at least one preset area corresponding to the at least one control instruction.

2. The touch interaction device according to claim 1, wherein the Hall sensor is disposed on the electronic device, and the magnetic device is disposed at the bottom of the accessory device; or
the Hall sensor is disposed at the bottom of the accessory device, and the magnetic device is disposed on the electronic device.

3. The touch interaction device according to claim 1, wherein the electronic device being configured to adjust the touch scanning frequency of the screen shielding area according to the screen shielding area, includes:
the electronic device being configured to, according to the screen shielding area, turn off touch scanning of the screen shielding area.

4. The touch interaction device according to claim 1, wherein the at least one sensing device is disposed at the bottom of the accessory device, and the at least one sensing device includes at least one of at least one device with a conductive function and at least one signal transmitter.

5. The touch interaction device according to claim 4, wherein the electronic device being configured to adjust the touch scanning frequency of the screen shielding area according to the screen shielding area, includes:
the electronic device being configured to reduce the touch scanning frequency of the screen shielding area according to the screen shielding area.

6. The touch interaction device according to claim 1, wherein the electronic device is further configured to:
restore the touch scanning frequency of the screen shielding area and turn on the display drive of the screen shielding area in a case where it is determined that the accessory device is away from the screen of the electronic device.

7. The touch interaction device according to claim 1, wherein the screen of the electronic device is a foldable screen.

8. The touch interaction device according to claim 1, wherein the accessory device includes a keyboard.

9. The touch interaction device according to claim 8, wherein the screen of the electronic device is a foldable screen; a dimension of a long side of the keyboard is smaller than or equal to a dimension of a short side of the electronic device, and a dimension of a short side of the keyboard is smaller than or equal to a dimension of a half of a long side the electronic device; the short side of the electronic device is parallel to a folding line of the foldable screen of the electronic device, and the long side of the electronic device is perpendicular to the folding line of the foldable screen of the electronic device.

10. A touch interaction method applied to a touch interaction device, the touch interaction device including an electronic device including a screen, an accessory device subordinate to the electronic device, and at least one sensing device, wherein the at least one sensing device is disposed in one of following ways: the at least one sensing device is disposed at a bottom of the accessory device, and the at least one sensing device is disposed at the bottom of the accessory device and on the electronic device; and the method comprising:
determining, by the electronic device, whether the accessory device is placed on the screen of the electronic device according to sensing information of the at least one sensing device;
determining, by the electronic device, a screen shielding area according to position information of the at least one sensing device in a case where the accessory device is placed on the screen of the electronic device, the screen shielding area being an area of the screen of the electronic device blocked by the accessory device;
adjusting, by the electronic device, touch scanning frequency of the screen shielding area, and turning off, by the electronic device, display drive of the screen shielding area, according to the screen shielding area;
wherein the at least one sensing device includes at least one Hall sensor and a magnetic device corresponding to the Hall sensor;
wherein the screen of the electronic device includes a plurality of preset areas, each preset area corresponds to a control instruction, and the control instruction is used for turning off touch scanning and display drive of the preset area; each preset area includes at least one of the at least one sensing device, the screen shielding area includes at least one preset area, and the electronic device includes a processor, a touch chip and a display drive chip; and the electronic device adjusting the touch scanning frequency of the screen shielding area and turning off the display drive of the screen shielding area according to the screen shielding area, includes:

sending, by the processor, at least one control instruction in one-to-one correspondence to the at least one preset area to the touch chip and the display drive chip according to the at least one preset area;

turning off by the touch chip, touch scanning of the at least one preset area corresponding to the at least one control instruction according to the at least one control instruction; and turning off by the display drive chip display drive of the at least one preset area corresponding to the at least one control instruction according to the at least one control instruction.

11. The touch interaction method according to claim 10, wherein adjusting the touch scanning frequency of the screen shielding area according to the screen shielding area, includes:

turning off touch scanning of the screen shielding area according to the screen shielding area.

12. The touch interaction method according to claim 10, wherein the at least one sensing device is disposed at the bottom of the accessory device, and the at least one sensing device includes at least one of at least one device with a conductive function and at least one signal transmitter.

13. The touch interaction method according to claim 12, wherein adjusting the touch scanning frequency of the screen shielding area according to the screen shielding area, includes:

reducing the touch scanning frequency of the screen shielding area according to the screen shielding area.

14. The touch interaction method according to claim 10, further comprising:

restoring the touch scanning frequency of the screen shielding area and turning on the display drive of the screen shielding area in a case where it is determined that the accessory device is away from the screen of the electronic device.

15. A non-transitory computer-readable storage medium having stored thereon computer program instructions that, when executed by a computer, perform the touch interaction method according to claim 10.

16. A computer program product stored on a non-transitory computer-readable storage medium, the computer program product comprising computer program instructions that are used for causing a computer to perform the touch interaction method according to claim 10.

* * * * *